United States Patent [19]
Kriz et al.

[11] Patent Number: 4,588,649
[45] Date of Patent: May 13, 1986

[54] AQUEOUS DIELECTRIC COATINGS BASED ON COPOLYMERS OF HIGH ACID CONTENT

[75] Inventors: Karel Kriz, Mount Prospect; Ralph L Minnis, Des Plaines, both of Ill.

[73] Assignee: DeSoto, Inc., Des Plaines, Ill.

[21] Appl. No.: 684,101

[22] Filed: Dec. 20, 1984

[51] Int. Cl.[4] .......... C08K 3/26

[52] U.S. Cl. .......... 428/511; 524/425; 524/446

[58] Field of Search .......... 524/425, 427, 446; 428/511

[56] References Cited

U.S. PATENT DOCUMENTS

| | | | |
|---|---|---|---|
| 3,915,917 | 10/1975 | Weiant | 524/425 |
| 3,957,710 | 5/1976 | Rohmann | 428/511 |
| 4,059,551 | 11/1977 | Weiant | 524/425 |
| 4,265,977 | 5/1981 | Kawamura | 428/511 |
| 4,267,092 | 5/1981 | Glaser | 524/425 |
| 4,351,754 | 9/1982 | Dupre | 524/446 |
| 4,397,984 | 8/1983 | Wendel | 428/511 |

*Primary Examiner*—Paul R. Michl
*Attorney, Agent, or Firm*—Dressler, Goldsmith, Shore, Sutker & Milnamow, Ltd.

[57] ABSTRACT

Dielectric coating compositions intended for application to conductive papers are disclosed. These coating compositions comprise a pigmented aqueous dispersion of a carboxyl-functional copolymer of copolymerized monoethylenically unsaturated monomers including form 8% to 18% by weight of monoethylenically unsaturated carboxylic acid, such as acrylic acid. The carboxyl-functional copolymer is dispersed in water with the aid of a volatile amine, such as ammonia, and the water dispersion is pigmented to contain calcium carbonate and/or clay in a pigment to binder weight ratio of from 0.5:1 to 6:1.

11 Claims, No Drawings

AQUEOUS DIELECTRIC COATINGS BASED ON COPOLYMERS OF HIGH ACID CONTENT

DESCRIPTION

1. Technical Field

This invention relates to aqueous dielectric coatings which are applied to conductive substrates, such as paper treated to render it conductive, which better resist migration of the conductive entities in the paper into the dielectric layer so as to provide superior print contrast when the coated paper is used in a dielectric copying process.

2. Background Art

Aqueous dielectric coatings have previously been applied to conductive papers to provide coated papers which are useful in dielectric copying processes. However, these known papers encounter difficulty because the conductive materials used to render the paper conductive migrate into the dielectric coating. Such migration in a severe case can cause the coating material to coagulate, but even when coagulation is avoided, the presence of conductive entities in he dielectric layer reduces the print contrast which is obtained.

DISCLOSURE OF INVENTION

In accordance with this invention, a copolymer of copolymerized monoethylenically unsaturated monomers is provided to include from 8% to 18% by weight, preferably from 9% to 15%, of monoethylenically unsaturated carboxylic acid, such as acrylic acid, methacrylic acid, or a mixture thereof. This carboxyl-functional copolymer is dispersed in water with the aid of a volatile amine, and the water dispersion is pigmented to contain calcium carbonate and/or clay in a pigment to binder weight ratio of from 0.5:1 to 6:1, preferably from 0.8:1 to 3;1. When these pigmented aqueous dispersions are coated onto conductive paper in an amount of at least about 4 pounds per ream, preferably from about 6 to about 9 pounds per ream, it is found that a marked improvement in the voltage which can be retained on the coated paper is obained as the carboxyl monomer content of the copolymer is increased above 6%, as will be illustrated. While acid has previously been used in such copolymers, 6% thereof represents more acid than would normally be used.

To illustrate the improvement which is provided, various tests were made using a copolymer of copolymerized monomers consisting of 41% methyl methacrylate, a variable proportion of acrylic acid, as hereinafter specified, and a balance of ethyl acrylate. These monomers were polymerized at 75% solids in isopropanol and dispersed in water using ammonium hydroxide (50% neutralization) at 35% solids content in the water with the isopropanol being removed by vaporization as the copolymer solution is dispersed in the water, this water dispersion being pigmented with calcium carbonate to various pigment to binder weight ratios and applied to the conductive paper at various weights. The following was found.

At 6.0 pounds per ream on one conductive paper substrate, and using a pigment to binder ratio of 1:1, at 6% acrylic acid the voltage retained by the paper is 75 volts. At 8.0 pounds per ream, the voltage is 100 volts. Increasing the acrylic acid content to 9%, at 6.0 pounds per ream, the voltage increases from 75 volts to 100 volts, and at 8.0 pounds per ream, the voltage increases from 100 volts to 140 volts.

The conductive paper substrate used above was an uncoated and uncalendered bond paper having a weight of about 42 pounds per 3,000 square feet which has been treated with an aqueous solution of Calgon 261 (Merck) to render it conductive. This is a common paper used for receiving solvent-based dielectric coatings.

Using the above dispersions on a different paper, at 6% acrylic acid, the voltage at 6.0 and 8.0 pounds per ream is about 15 volts. At 9% acrylic acid, the voltage at both coating weights is about 25 volts. At 12% acrylic acid, at 6 pounds per ream the voltage which is retained is about 50 volts and at 8 pounds per ream it is about 75 volts. At 15% acrylic acid, at 6 pounds per ream the voltage which is retained is about 90 volts and at 8 pounds per ream it is about 135 volts.

This paper was also an uncoated and uncalendered bond paper commonly used for receiving solvent-based dielectric coatings. It had a weight of 37 pounds per 3000 square feet and was slightly dinser than the first. It was also rendered conductive by treatment with an aqueous solution of Calgon 261.

Using dispersions which are the same as those used above, but now at a 2:1 pigment to binder weight ratio, and applying these dispersions to the first paper used above: at 6% acrylic acid, the voltage at 7 pounds per ream is about 15 volts and at 9 pounds per ream it is about 35 volts. At 9% acrylic acid, at 7 pounds per ream the voltage which is retained is about 55 volts and at 9 pounds per ream it is about 75 volts. At 12% acrylic acid, at 7 pounds per ream the voltage which is retained is about 80 volts and at 9 pounds per ream it is about 125 volts. It will be noted that as the pigmentation level increases, the normal range of coating weights is slightly higher than at the lower pigmentation level.

Using dispersions which are the same as those used above, again at a 2:1 pigment to binder weight ratio, and applying these dispersions to the second paper used above: at 6% acrylic acid, the voltage at 7 and at 9 pounds per ream is about 15 volts. At 9% acrylic acid, at 7 pounds per ream the voltage which is retained is about 25 volts and at 9 pounds per ream it is about 30 volts. At 12% acrylic acid, at 7 pounds per ream the voltage which is retained is about 60 volts and at 9 pounds per ream it is about 75 volts. At 15% acrylic acid, at 7 pounds per ream the voltage which is retained is about 105 volts and at 9 pounds per ream it is about 150 volts.

The evidence thus shows a surprising improvement as the acid content increases, for there is no known reason why such larger amounts of acid should increase the retained voltage, but more than about 18% acid cannot be used because the viscosity in aqueous medium becomes excessive.

In the above tests, the isopropanol solvent is removed, but this is not essential, and it can be permitted to remain in the aqueous medium.

The monethylenically unsaturated acid which is selected is of secondary interest, although acrylic acid and methacrylic acid, as well as mixtures thereof, are normally selected because they are available at relatively low cost. While the unusually high proportion of acid is the most significant factor, best results are obtained using acrylic acid. While monocarboxylic acids are usually selected, polycarboxylic acids, like fumaric acid and crotonic acid, are also useful.

The balance of the copolymer is desirably constituted by acrylic and methacrylic esters. Since relatively hard copolymers are preferred, a large proportion of methyl methacrylate is desirably. Other acrylic and methacrylic esters which are contemplated are methyl acrylate, ethyl acrylate, isobutyl acrylate, ethyl methacrylate, n-butyl methacrylate, and the like. Other monoethylenic monomers, like butyl vinyl ether, styrene and vinyl toluene, are also useful. The selection of monoethylenic monomers for the production of water dispersible copolymers is itself a matter of common knowledge, so this selection is not of prime interest to this invention.

The polymerization which is contemplated is preferably a solution copolymerization, which is itself conventional. Since water dispersion is intended, the solvent should be water miscible, and isopropanol is presently preferred, though other alcohols, like ethanol, and ether alcohols, such as 2-ethoxy ethanol, are useful herein. As previously indicated, the solvent can be allowed to remain with the aqueous dispersion, or it can be removed in whole or in part, and both of these techniques are known in the field of aqueous coating compositions.

The volatile amine which is used to neutralize the carboxyl groups of the copolymer to enable water dispersion and to maintain the dispersion when calcium carbonate is added is subject to wide variation, as is well known. Volatile amines are commonly used to disperse carboxyl-functional copolymers in water, and ammonia is regarded to be an amine for this purpose. Indeed, ammonia is the preferred amine, as is also well known. While many amines, and especially tertiary amines are available for the purpose at hand, as well known in the art, triethyl amine will further illustrate the class of useful volatile amines.

In the high acid content copolymers used herein, as little as about 35% neutralization is usually adequate for solubility in water, and this can be varied considerably in both directions. The ammonia concentration is desirably minimized to reduce ammonia emissions. As is well known, ammonia is not dangerous, but it has a sharp odor which is desirably minimized by the use of hoods to remove fumes and by adequate ventillation. The neutralization need not be complete and normally is not complete in this invention, it being preferred to neutralize from 20% to 50% of the carboxyl functionality which is available in the copolymer.

While calcium carbonate is the preferred pigment, clay, such as kaolin clay, may be used to replace it in whole or in part.

EXAMPLE 525 grams of methyl methacrylate, 750 grams of ethyl acrylate, and 225 grams of acrylic acid were mixed with 225 grams of isopropanol and 30 grams of azobisisobutyronitrile (Vazo 64 from Dupont may be used) free radical generating catalyst, and the mixture was slowly added to 750 grams of isopropanol maintained at 85° C. in a 5 liter flask. After about 9 hours, the contents of the flask were allowed to cool to room temperature, and then 88.5 grams of concentrated ammonium hydroxide (36% in water) were added followed by 2100 grams of deionized water. The mixture was then heated to about 90° C. with agitation to vaporize away the isopropanol so that the final composition contains less than 3% of isopropanol. The product is then cooled to room temperature, and additional deionized water was added to provide a viscosity of 1,465 centipoises at 40.0% solids content. The pH was 7.0.

The aqueous dispersion is then blended with calcium carbonate pigment (atomite) to provide the desired ratio of pigment to binder in the dispersion (1:1 and 2:1 pigment to binder weight ratios were provided), and water is added as needed to provide coating viscosity. Coating upon a selected paper base can be accomplished with a wire wound rod to obtain the coating weight which is desired. The coated and dried paper is tested by passing it through a negative double corona, and the surface voltage is read using a Keithley electrometer attached to a probe. The prints obtained using a Versatec 1200 printer showed that higher print density is obtained whenever a higher surface voltage is recorded.

What is claimed is:

1. Conductive paper coated with a dielectric coating composition comprising, a pigmented aqueous dispersion of a carboxyl-functional copolymer of copolymerized monoethylenically unsaturated monomers including from 8% to 18% by weight of monoethylenically unsaturated carboxylic acid, based on the total weight of monoethylenic monomer, this carboxyl-functional copolymer being dispersed in water with the aid of a volatile amine, and the water dispersion being pigmented to contain calcium carbonate and/or clay in a pigment to binder weight ratio of from 0.5:1 to 6:1, said coating composition being applied to said conductive paper in an amount of at least about 4 pounds per ream.

2. Conductive paper as recited in claim 1 in which said copolymer includes from 9% to 15% of copolymerized unsaturated carboxylic acid.

3. Conductive paper as recited in claim 1 in which said carboxylic acid is acrylic acid, methacrylic acid, or a mixture thereof.

4. Conductive paper as recited in claim 1 in which said volatile amine is ammonia.

5. Conductive paper as recited in claim 4 in which said carboxylic acid is acrylic acid.

6. Conductive paper as recited in claim 1 in which said volatile amine is present to neutralize from 20% to 50% of the carboxyl groups which are present.

7. Conductive paper as recited in claim 1 in which said water dispersion is pigmented to contain calcium carbonate in a pigment to binder weight ratio of from 0.8:1 to 3:1.

8. Conductive paper as recited in claim 7 in which said copolymerized monoethylenically unsaturated monomers are acrylic and methacrylic acid esters.

9. Conductive paper as recited in claim 8 in which said monomers comprise methyl methacrylate.

10. Conductive paper as recited in claim 9 in which said volatile amine is ammonia and said copolymer contains from 9% to 15% of acrylic acid.

11. Coated conductive paper as recited in claim 10 in which said coating is present in an amount of from about 6 to about 9 pounds per ream.

* * * * *